(12) United States Patent
Lim

(10) Patent No.: US 9,395,566 B2
(45) Date of Patent: Jul. 19, 2016

(54) LIQUID CRYSTAL DISPLAY BACKLIGHT DEVICE

(75) Inventor: Sil Kyu Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 13/541,356

(22) Filed: Jul. 3, 2012

(65) Prior Publication Data

US 2013/0010223 A1   Jan. 10, 2013

(30) Foreign Application Priority Data

Jul. 7, 2011   (KR) .................. 10-2011-0067198

(51) Int. Cl.
G02F 1/1333   (2006.01)
G02F 1/1335   (2006.01)

(52) U.S. Cl.
CPC ........ G02F 1/133308 (2013.01); *G02F 1/1336* (2013.01); *G02F 2001/133314* (2013.01); *G02F 2001/133317* (2013.01); *G02F 2201/503* (2013.01)

(58) Field of Classification Search
USPC ........................................................ 349/150
See application file for complete search history.

(56) References Cited

U.S. PATENT DOCUMENTS

| 8,077,273 | B2 * | 12/2011 | Mishima et al. ................. 349/65 |
| 8,319,909 | B2 * | 11/2012 | Oohira ............................. 349/58 |
| 2002/0027634 | A1 * | 3/2002 | Kang et al. ..................... 349/150 |
| 2007/0091225 | A1 * | 4/2007 | Ma et al. .......................... 349/58 |
| 2011/0149196 | A1 * | 6/2011 | Tanaka ............................. 349/58 |

* cited by examiner

*Primary Examiner* — Richard Kim
(74) *Attorney, Agent, or Firm* — Jefferson IP Law, LLP

(57) ABSTRACT

A liquid crystal display backlight device for reducing a thickness of a terminal is provided. The liquid crystal display backlight device includes a backlight unit disposed at a lower part of a liquid crystal display module, a set bracket for mounting while enclosing the backlight unit, and a liquid crystal display Flexible Printed Circuit Board (FPCB) folded from the liquid crystal display module to a rear surface of the set bracket. Therefore, a thickness and width of the liquid crystal display backlight device can further be reduced and thus a user can easily carry the liquid crystal display backlight device. Further, rigidity of the set bracket can be prevented from being weakened.

17 Claims, 5 Drawing Sheets

LIQUID CRYSTAL DISPLAY BACKLIGHT DEVICE

PRIORITY

This application claims the benefit under 35 U.S.C. §119(a) of a Korean patent application filed on Jul. 7, 2011 in the Korean Intellectual Property Office and assigned Serial No. 10-2011-0067198, the entire disclosure of which is hereby incorporated by reference.

BACKGROUND OF THE INVENTION

1. Field of the Invention

The present invention relates to a liquid crystal display backlight device. More particularly, the present invention relates to a liquid crystal display backlight device that can further reduce a thickness of a terminal.

2. Description of the Related Art

In general, a Liquid Crystal Display (LCD) backlight device as a display device is widely used for a portable electronic product having a multimedia function such as a mobile phone, a Moving Picture Experts Group (MPEG) audio layer-3 (MP3) player, a Personal Digital Assistant (PDA), a Digital Multimedia Broadcasting (DMB) terminal, and an electronic dictionary. The LCD backlight device has a frame for mounting an LCD module and a backlight unit.

FIG. 1 is a cross-sectional view illustrating an LCD backlight device in an X-axis direction according to the related art, and FIG. 2 is a cross-sectional view illustrating an LCD backlight device in a Y-axis direction according to the related art.

Referring to FIGS. 1 and 2, the LCD backlight device 100 is described. For reference, in the present description, an X-axis direction is a width direction of the LCD backlight device 100, a Y-axis direction is a length direction of the LCD backlight device 100, and a Z-axis direction is a thickness direction of the LCD backlight device 100.

The LCD backlight device 100 includes a backlight unit 110, a touch screen panel 120, an LCD module 130, a set bracket 140, an upper case 160, and a frame 170. The backlight unit 110 and the LCD module 130 are attached by an LCD double-sided adhesive tape 150 and are mounted in and supported by the frame 170. The frame 170 includes a metal portion 171 and a mold portion 172, and the metal portion 171 includes a side protection portion 173 formed in a side portion of the backlight unit 110 and the LCD module 130 and a support 174 formed in a lower part of the backlight unit 110 and for supporting the backlight unit 110. The metal portion 171 is formed with Stainless Steel (SUS).

In the LCD backlight device 100, the side protection portion 173 of the metal portion 171 of the frame 170 has a preset thickness C, i.e., 0.2 mm based on a Wide Video Graphic Array (WVGA) and has a preset gap D, i.e., 0.25 mm based on a WVGA between the side protection portion 173 and the set bracket 140 and thus a limitation exists in reducing a width W1 of the LCD backlight device 100. Further, because the support 174 of the metal portion 171 of the frame 170 has a preset thickness E, i.e., 0.2 mm based on a WVGA, a limitation exists in reducing a thickness H1 of the LCD backlight device 100.

Further, as illustrated in FIG. 2, because an LCD Flexible Printed Circuit Board (FPCB) 180 connected to the LCD module 130 has a folded structure between the support 174 of the frame 170 and the set bracket 140, an opening 141 for positioning an electronic component 190 mounted in the LCD FPCB 180 should be formed in the set bracket 140. Accordingly, a problem exists in that rigidity of the set bracket 140 is reduced.

SUMMARY OF THE INVENTION

Aspects of the present invention are to address at least the above-mentioned problems and/or disadvantages and to provide at least the advantages described below. Accordingly, an aspect of the present invention is to provide a Liquid Crystal Display (LCD) backlight device that a user can easily carry by further reducing a thickness and width of the LCD backlight device.

Another aspect of the present invention is to provide an LCD display backlight device that can prevent rigidity of a set bracket from decreasing.

In accordance with an aspect of the present invention, an LCD backlight device is provided. The device includes a backlight unit disposed at a lower part of an LCD module, a set bracket for mounting while enclosing the backlight unit, and an LCD Flexible Printed Circuit Board (FPCB) folded from the LCD module to a rear surface of the set bracket.

In accordance with another aspect of the present invention, an LCD backlight device is provided. The device includes a backlight unit disposed at a lower part of a liquid crystal display module, a set bracket comprising a mounting surface for mounting the backlight unit flat while enclosing the backlight unit; and a liquid crystal display Flexible Printed Circuit Board (FPCB) folded from the liquid crystal display module to a rear surface of the set bracket.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 3:
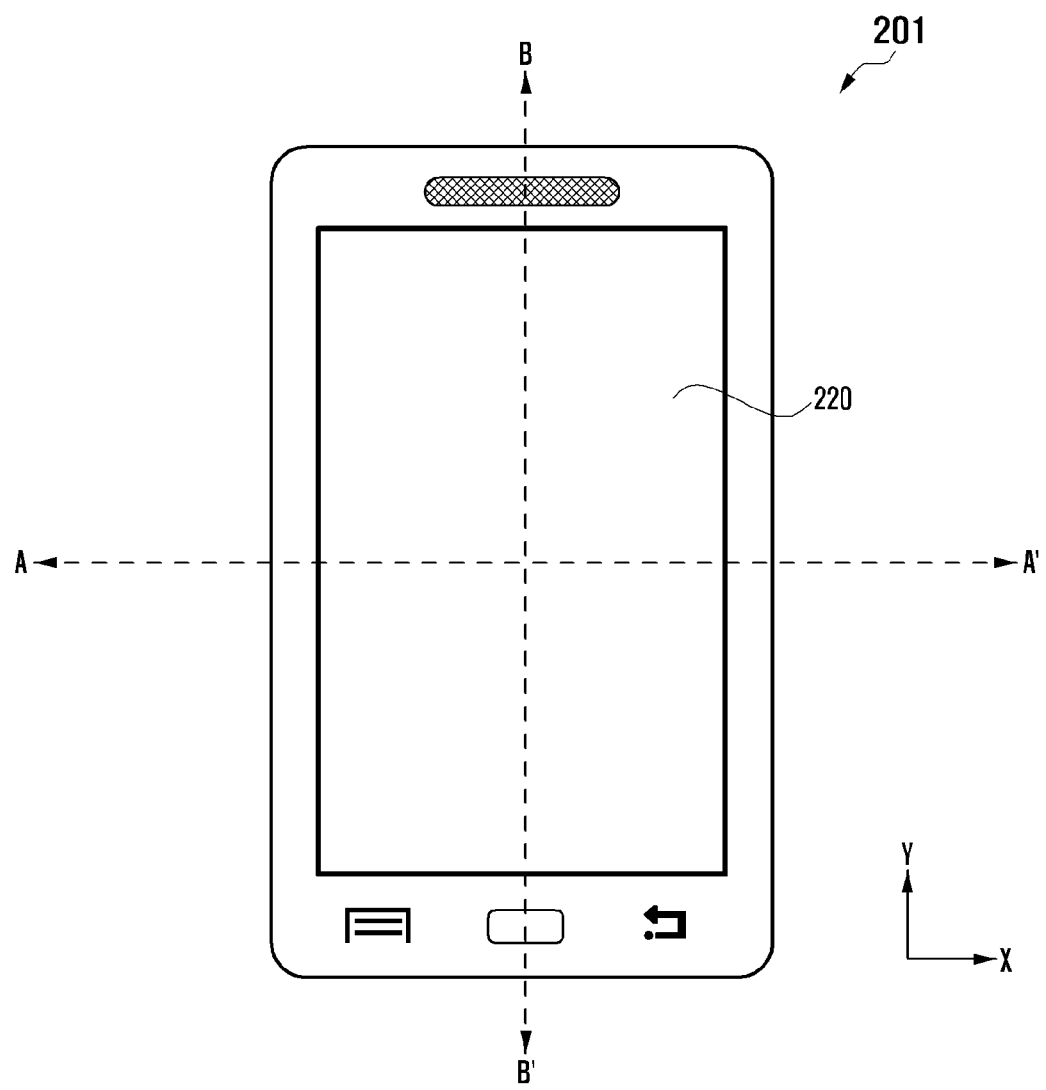
FIG. 3 is a plan view illustrating a mobile terminal having an LCD backlight device according to an exemplary embodiment of the present invention.
Figure 4:
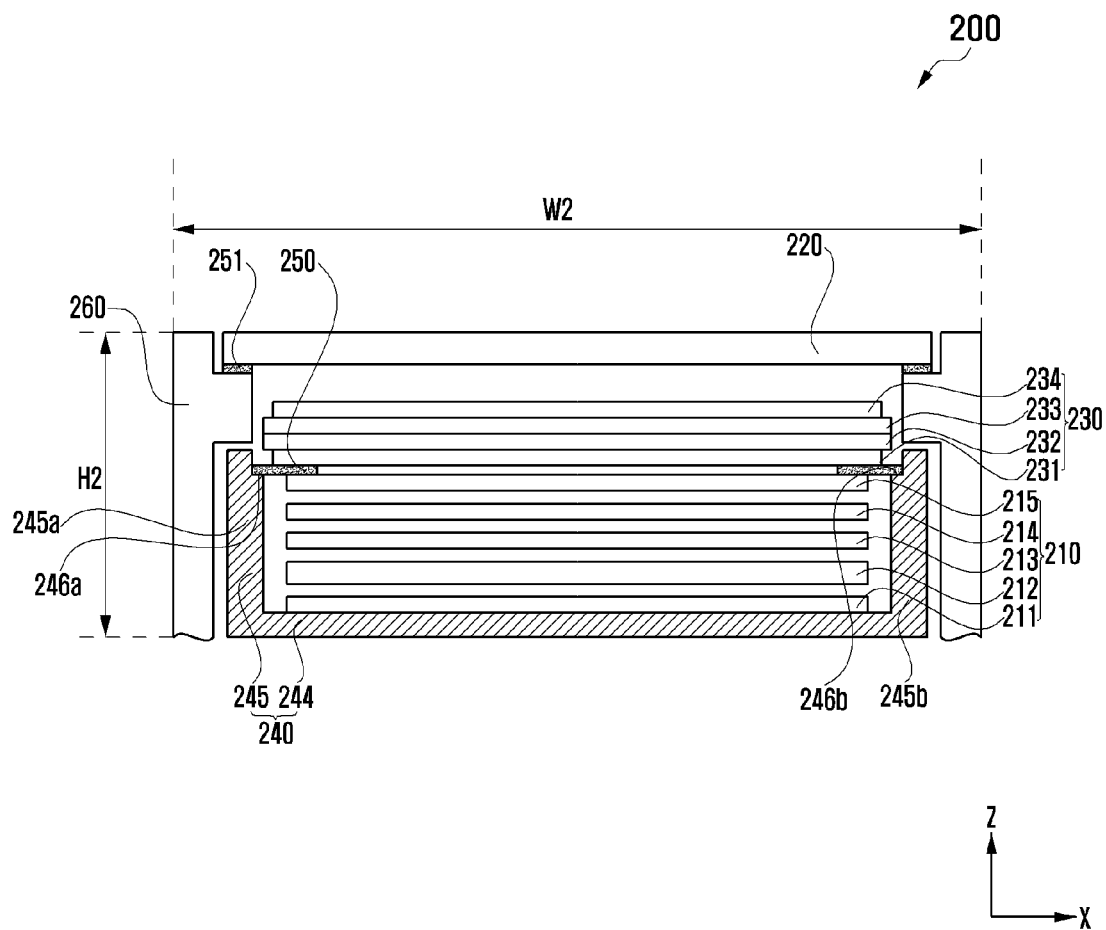
FIG. 4 is a cross-sectional view illustrating an LCD backlight device in an X-axis direction taken along line A-A' of FIG. 3 according to an exemplary embodiment of the present invention.
Figure 5:
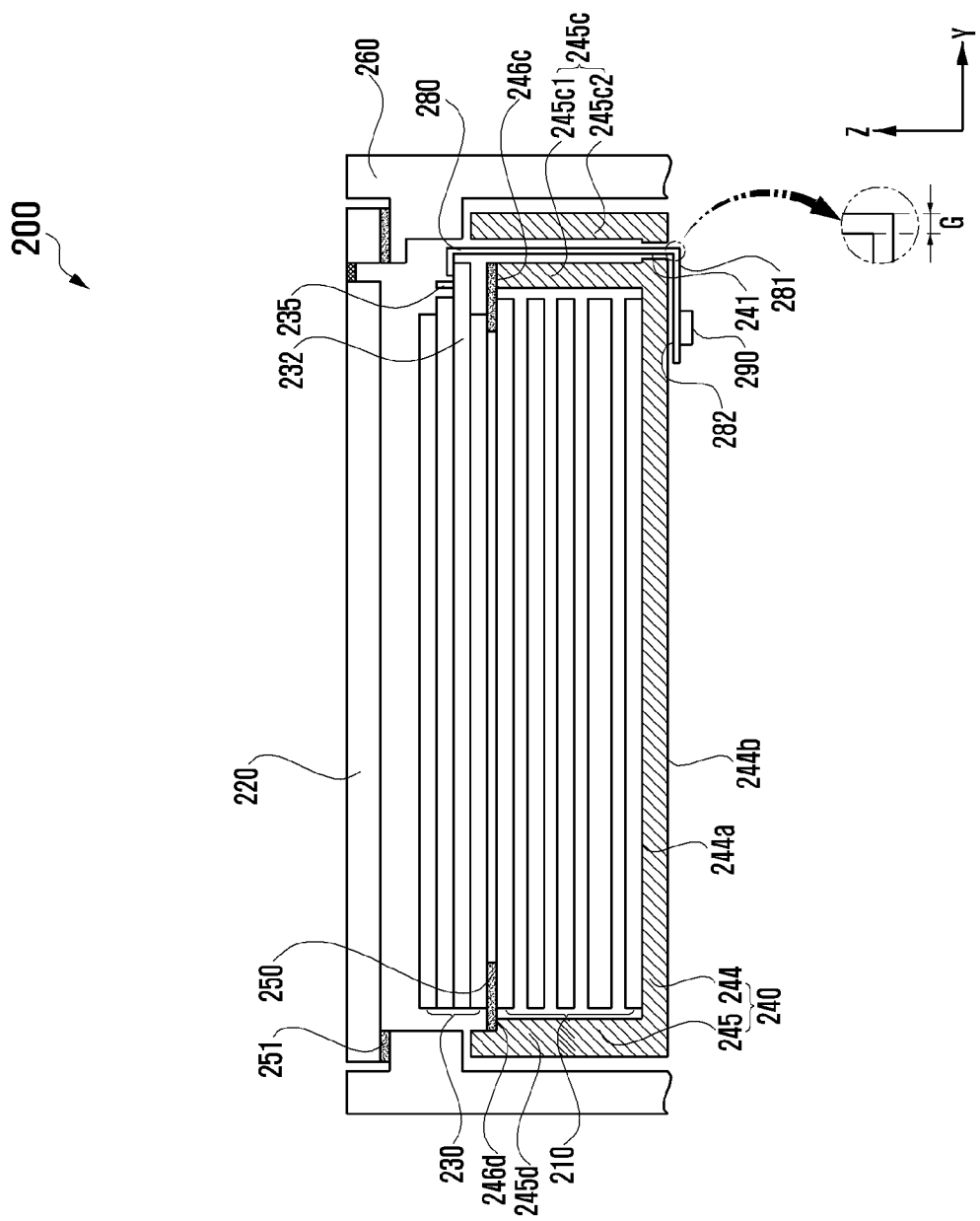
FIG. 5 is a cross-sectional view illustrating an LCD backlight device in a Y-axis direction taken along line B-B' of FIG. 3 according to an exemplary embodiment of the present invention.

FIG. 3 is a plan view illustrating a mobile terminal having a Liquid Crystal Display (LCD) backlight device according to an exemplary embodiment of the present invention, FIG. 4 is a cross-sectional view illustrating an LCD backlight device in an X-axis direction taken along line A-A' of FIG. 3 according to an exemplary embodiment of the present invention, and FIG. 5 is a cross-sectional view illustrating an LCD backlight device in a Y-axis direction taken along line B-B' of FIG. 3 according to an exemplary embodiment of the present invention. For reference, line A-A' of the X-axis direction and line B-B' of the Y-axis direction illustrated in FIG. 3 pass through a touch screen panel 220 of a mobile terminal 201 in an X-axis direction and a Y-axis direction, respectively.

Referring to FIGS. 3 to 5, an LCD backlight device 200 according to an exemplary embodiment of the present invention is described. The LCD backlight device 200 includes a backlight unit 210, a touch screen panel 220, an LCD module 230, a set bracket 240, an LCD double-sided adhesive tape 250, an upper case 260, and an LCD Flexible Printed Circuit Board (FPCB) 280.

The backlight unit 210 is disposed at a lower part of the LCD module 230, which is not a self luminescent display, and performs a function of evenly radiating light in order to enable a user to view a display image. The backlight unit 210 includes a reflective sheet 211, a light guide plate 212, a diffusion sheet 213, a first prism sheet 214, and a second prism sheet 215. The light guide plate 212 guides light generated in a light source (not illustrated). In a lower part of the light guide plate 212, the reflective sheet 211 for reflecting light transmitted downward through a lower surface of the light guide plate 212 toward the light guide plate 212 is disposed. In an upper part of the light guide plate 212, the diffusion sheet 213 for dispersing light applied from the light guide plate 212 is disposed. In an upper part of the diffusion sheet 213, the first prism sheet 214 for focusing light advanced toward the second prism sheet 215 in a Y-axis direction is disposed. In the upper part of the first prism sheet 214, the second prism sheet 215 for focusing light advanced toward the LCD module 230 in an X-axis direction is disposed.

The LCD module 230 displays a desired image by changing a transmission form of light applied from the backlight unit 210 according to an electric stimulus applied to liquid crystal and includes a lower polarizing plate 231, Thin Film Transistor (TFT) glass 232, color filter glass 233, and an upper polarizing plate 234. The lower polarizing plate 231 polarizes light applied from the backlight unit 210 and is disposed at an upper part of the second prism sheet 215. In an upper part of the lower polarizing plate 231, the TFT glass 232 for controlling liquid crystal (not illustrated) formed in an upper surface in a pixel unit using a thin film transistor is disposed. At the edge of an upper surface of the TFT glass 232, an LCD driver Integrated Circuit (IC) 235 for driving the LCD module 230 is mounted. In an upper part of the TFT glass 232, the color filter glass 233 for determining a color of light passing through the liquid crystal by coating a pixel having three primary colors consisting of red, blue, and green on glass is disposed. In an upper part of the color filter glass 233, the upper polarizing plate 234 for polarizing light transmitted from the color filter glass 233 is disposed. For reference, it is preferable that a surface treatment for preventing adsorption, sparkling, and Newton's ring is performed in the upper polarizing plate 234.

The set bracket 240 is configured so as to enclose the backlight unit 210 and may be formed with SUS or magnesium. The set bracket 240 includes a support 244 that is formed in a lower part of the backlight unit 210 for supporting the backlight unit 210 and a side protection portion 245 separated from a side portion of the backlight unit 210. The support 244 has a penetration groove 241 for passing through the LCD FPCB 280. The side protection portion 245 includes a first side protection portion 245a and a second side protection portion 245b opposite to each other in the X-axis direction, and a third side protection portion 245c and a fourth side protection portion 245d opposite to each other in the Y-axis direction. The fourth side protection portion 245d is a side protection portion adjacent to the LCD FPCB 280 and includes an inner side protection portion 245c1 positioned to recede inwardly from the LCD FPCB 280 and an outer side protection portion 245c2 positioned outwardly from the LCD FPCB 280. The first to fourth side protection portions 245a, 245b, 245c, and 245d have attaching surfaces 246a, 246b, 246c, and 246d, respectively, for attaching the LCD double-sided adhesive tape 250, and a step portion is formed in the attaching surfaces 246a, 246b, and 246d of the first, second, and fourth side protection portions 245a, 245b, and 245d, as illustrated in FIGS. 4 and 5. Further, the attaching surface 246c of the third side protection portion 245c is formed in the inner side protection portion 245c1.

The LCD double-sided adhesive tape 250 is a tape in which both surfaces have adhesive strength, and the edge of a lower surface of the LCD module 230 is adhered to one surface thereof and the edge of an upper surface of the backlight unit 210 is adhered to one side of the other surface thereof, and the attaching surfaces 246a, 246b, 246c, and 246d of the first to fourth side protection portions 245a, 245b, 245c, and 245d are adhered to the other side of the other surface thereof. Accordingly, the LCD double-sided adhesive tape 250 performs a function of attaching the LCD module 230, the backlight unit 210, and the set bracket 240.

The LCD FPCB 280 drives the LCD driver IC 235. The LCD FPCB 280 is folded from the LCD module 230 to a rear surface 244b of the set bracket 240. One end of the LCD FPCB 280 is connected to the TFT glass 232 of the LCD module 230, and a connector (not illustrated) formed at the other end of the LCD FPCB 280 is connected to a main board (not illustrated). A surface of the LCD FPCB 280 includes a mounting surface 281 in which an electronic component 290 is mounted and an opposite surface 282 of the mounting surface 281. The opposite surface 282 is opposite to the rear surface 244b of the set bracket 240. For reference, in the LCD FPCB 280 illustrated in FIG. 5, a portion extended in a Z-axis direction is longer than that extended in the Y-axis direction. However, in an exemplary implementation, a portion extended in the Y-axis direction may be longer than that extended in the Z-axis direction.

The upper case 260 protects the LCD backlight device 200 from the outside and is formed in an upper part of the mobile terminal 201 illustrated in FIG. 3. The upper case 260 is separated along a side surface of the set bracket 240 and the module 230.

The touch screen panel 220 detects a user touch to a specific point of an image displayed from the LCD module 230 and is disposed at an upper part of the LCD module 230. The touch screen panel 220 is attached to the upper case 260 by a touch screen panel double-sided adhesive tape 251. In an exemplary implementation, the touch screen panel 220 is disposed at an upper part of the LCD module 230. However a window that has no touch screen function and that has only a function of transmitting an image displayed from the LCD module 230 may be disposed.

Figure 1:
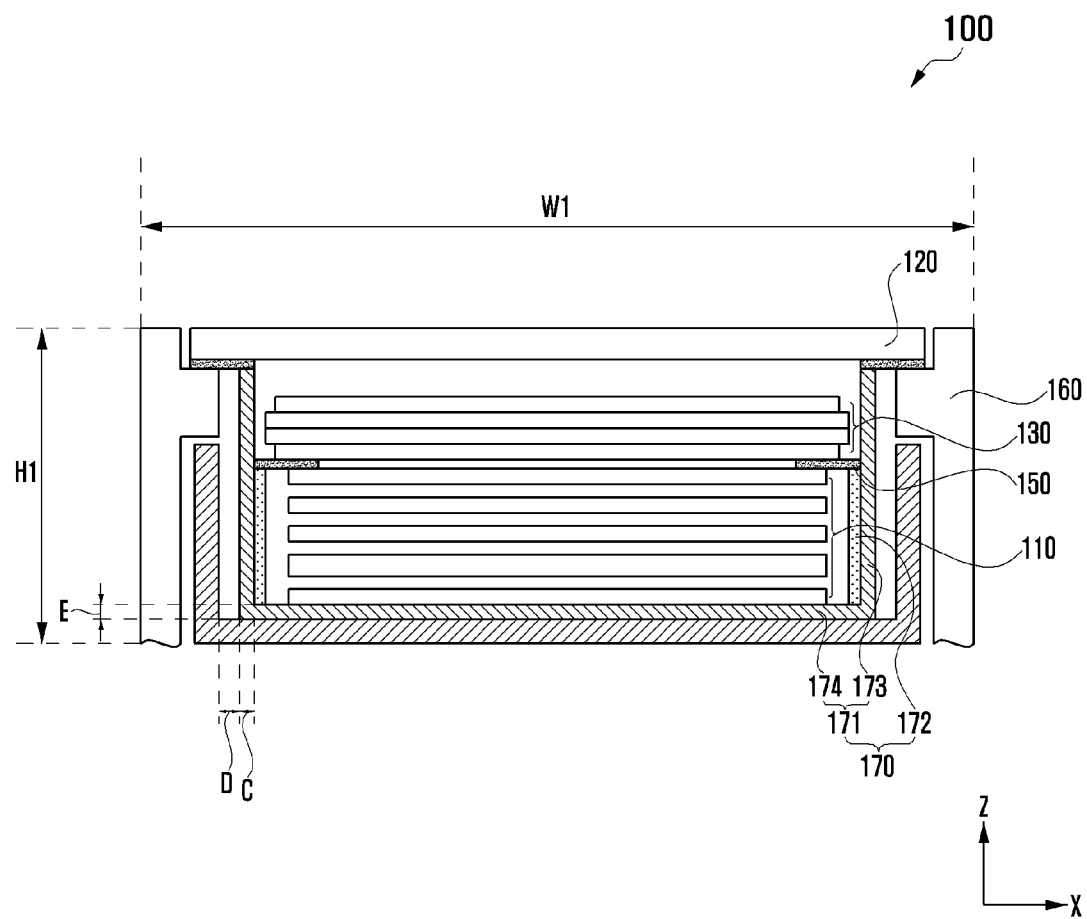
FIG. 1 is a cross-sectional view illustrating a Liquid Crystal Display (LCD) backlight device in an X-axis direction according to the related art.

In the LCD backlight device 200 according to an exemplary embodiment of the present invention, the set bracket 240 directly mounts while enclosing the backlight unit 210, unlike the LCD backlight device 100 according to the related art illustrated in FIG. 1. Since the metal portion 171 of the frame 170 illustrated in FIG. 1 is removed, a thickness H2 and width W2 of the LCD backlight device 200 can be reduced. More specifically, in the LCD backlight device 200 according to an exemplary embodiment of the present invention, a thickness H2 reduces by 0.2 mm, and a width W2 reduces by 0.9 mm based on a WVGA, compared with the LCD backlight device 100 according to the related art as illustrated in FIG. 1.

Figure 2:
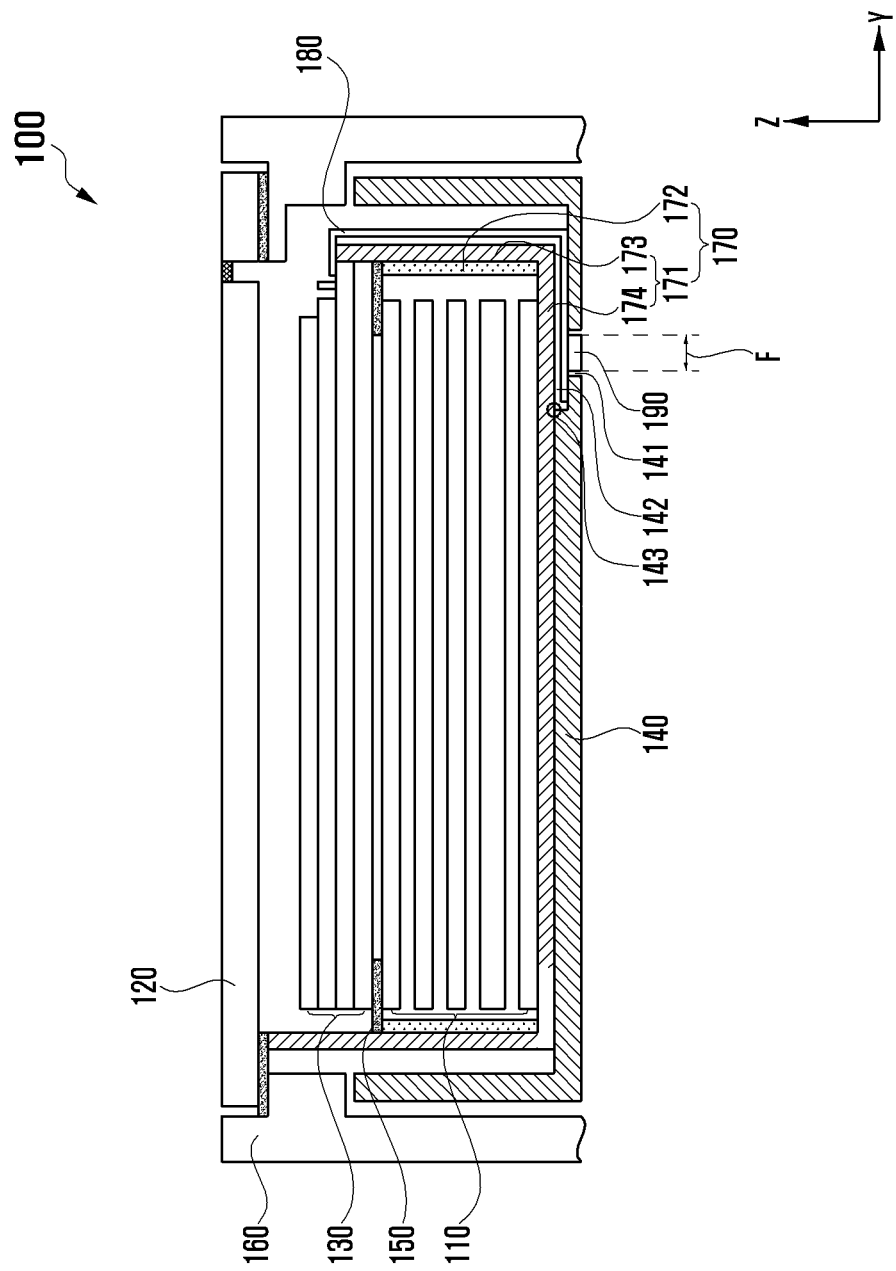
FIG. 2 is a cross-sectional view illustrating an LCD backlight device in a Y-axis direction according to the related art.

Further, unlike the LCD backlight device 100 according to the related art as illustrated in FIG. 2, the LCD backlight device 200 according to an exemplary embodiment of the present invention has a structure in which the LCD FPCB 280 is folded from the LCD module 230 to the rear surface 244b of the set bracket 240. Therefore, because the opening 141 for the electronic component 190 illustrated in FIG. 2 is unnecessary, rigidity of the set bracket 240 can be prevented from being decreased. In the set bracket 240 according to an exemplary embodiment of the present invention, the penetration groove 241 for passing through the LCD FPCB 280 is formed. However, a thickness G of the LCD FPCB is negligibly smaller than a length F of the electronic component 190 illustrated in FIG. 2 and thus any decrease of rigidity of the set bracket 240 due to the penetration groove 241 is negligible and may be ignored.

Further, in the LCD backlight device 100 according to the related art, as illustrated in FIG. 2, as space 142 for disposing the LCD FPCB 180 is formed in the set bracket 140, a corner 143 for contacting with the metal portion 171 of the frame 170 is formed in the set bracket 140. However, because the metal portion 171 of the frame 170 is thinner than the set bracket 140, the corner 143 may apply damage to the backlight unit 110 due to an outside impact. Accordingly, a problem occurs in that a white line or a white point appears in the LCD backlight device 100.

However, in the LCD backlight device 200 according to an exemplary embodiment of the present invention, as illustrated in FIG. 5, because the LCD FPCB 280 is folded from the LCD module 230 to the rear surface 244b of the set bracket 240, a mounting surface 244a of the set bracket 240 in which the backlight unit 210 is mounted is flat. Therefore, the white line or the white point that appears in the LCD backlight device 200 can be prevented.

As described above, according to exemplary embodiments of the present invention, an LCD backlight device includes a set bracket for mounting while enclosing a backlight unit, and thus a thickness and width of the LCD backlight device can further be reduced. Accordingly, a user can easily carry the LCD backlight device.

Further, as the LCD backlight device includes an LCD FPCB folded from an LCD module to a rear surface of the set bracket, rigidity of the set bracket can be prevented from being weakened.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A liquid crystal display backlight device, the device comprising:
a backlight unit disposed at a lower part of a liquid crystal display module;
a set bracket configured to mount while enclosing the backlight unit;
a liquid crystal display Flexible Printed Circuit Board (FPCB) folded from the liquid crystal display module to a rear surface of the set bracket; and
an upper case configured along and separated from a side surface of the set bracket,
wherein the set bracket has a penetration groove configured to pass the liquid crystal display FPCB substantially vertically through a lowest most portion of a bottom of the set bracket, the upper case being separate from penetration groove, and
wherein the fold of the FPCB from the liquid crystal display module to the rear surface of the set bracket occurs at the point where the FPCB passes through the lowest most portion of a bottom of the set bracket.

2. The device of claim 1, wherein the liquid crystal display FPCB comprises a surface that includes a mounting surface on which an electronic component is mounted and an opposite surface of the mounting surface of the electronic component that is opposite to a rear surface of the set bracket.

3. The device of claim 1, wherein the set bracket comprises a side protection portion separated from a side portion of the backlight unit.

4. The device of claim 3, wherein the side protection portion is attached to a double-sided tape configured to attach the liquid crystal display module and the backlight unit.

5. The device of claim 1, wherein the liquid crystal display FPCB comprises one end that is connected to Thin Film Transistor (TFT) glass of the liquid crystal display module.

6. The device of claim 5, wherein the liquid crystal display FPCB comprises another end that is connected to a main board.

7. The device of claim 1, wherein the liquid crystal display FPCB drives a liquid crystal display driver Integrated Circuit (IC) and the liquid crystal display driver IC drives the liquid crystal display module.

8. The device of claim 1, wherein the set bracket comprises a mounting surface in which the backlight unit is mounted flat.

9. The device of claim 1, wherein the set bracket is formed with at least one of stainless steel and magnesium.

10. A liquid crystal display backlight device, the device comprising:
a backlight unit disposed at a lower part of a liquid crystal display module;

a set bracket comprising a mounting surface configured to mount the backlight unit flat while enclosing the backlight unit;

a liquid crystal display Flexible Printed Circuit Board (FPCB) folded from the liquid crystal display module to a rear surface of the set bracket; and an upper case configured along and separated from a side surface of the set bracket, wherein the set bracket has a penetration groove configured to pass the liquid crystal display FPCB substantially vertically through a lowest most portion of a bottom of the set bracket, the upper case being separate from penetration groove, and wherein the fold of the FPCB from the liquid crystal display module to the rear surface of the set bracket occurs at the point where the FPCB passes through the lowest most portion of a bottom of the set bracket.

11. The device of claim 10, wherein the liquid crystal display FPCB comprises a surface that includes a mounting surface in which an electronic component is mounted and an opposite surface of the mounting surface of the electronic component that is opposite to a rear surface of the set bracket.

12. The device of claim 10, wherein the set bracket comprises a side protection portion separated from a side portion of the backlight unit.

13. The device of claim 12, wherein the side protection portion is attached to a double-sided tape configured to attach the liquid crystal display module and the backlight unit.

14. The device of claim 10, wherein the liquid crystal display FPCB comprises one end that is connected to Thin Film Transistor (TFT) glass of the liquid crystal display module.

15. The device of claim 14, wherein the liquid crystal display FPCB comprises another end that is connected to a main board.

16. The device of claim 15, wherein the liquid crystal display FPCB drives a liquid crystal display driver Integrated Circuit (IC) and the liquid crystal display driver IC drives the liquid crystal display module.

17. The device of claim 10, wherein the set bracket is formed with at least one of stainless steel and magnesium.

* * * * *